Dec. 21, 1926.

G. E. KOPP 1,611,647

ANTIGLARE LENS ATTACHMENT

Filed May 18, 1926

Inventor
George E. Kopp
By Frease and Bond
Attorneys

Patented Dec. 21, 1926.

1,611,647

UNITED STATES PATENT OFFICE.

GEORGE E. KOPP, OF CANTON, OHIO.

ANTIGLARE-LENS ATTACHMENT.

Application filed May 18, 1926. Serial No. 109,872.

The invention relates to lens attachments for preventing glare in headlights of automobiles and the like, and the objects of the invention are to provide an economical, easily manufactured and easily applied attachment for the lenses of such headlights, enabling oncoming persons to look almost directly into the headlights supplied with the attachment without substantially impairing their vision, and at the same time maintaining satisfactory illumination from the headlights for lighting the roadway and the like upon which the headlights may be directed.

These objects are attained by means of a translucent colored ring disk of one shade and a translucent colored crescent-like disk of another shade, and preferably made of kodeloid, superposed upon each other and applied against the headlight lens preferably from the inside of the headlight, and suitably secured thereto.

A preferred embodiment of the invention is illustrated in the accompanying drawings forming part hereof, in which—

Figure 1:
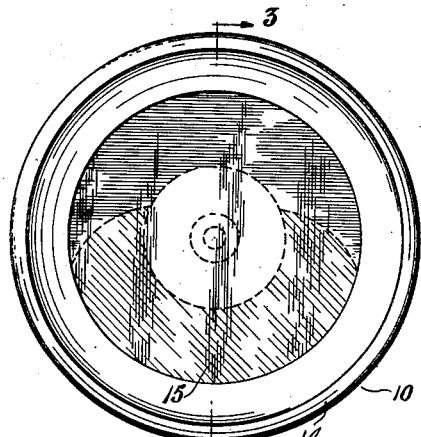
Figure 2:
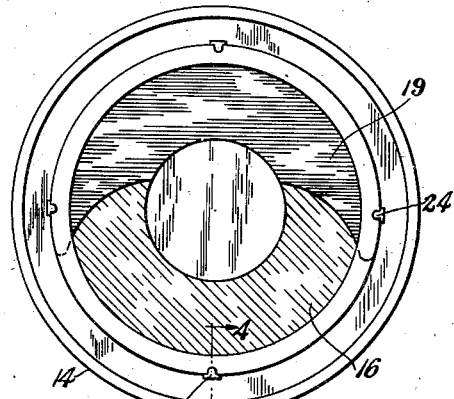
Figure 3:
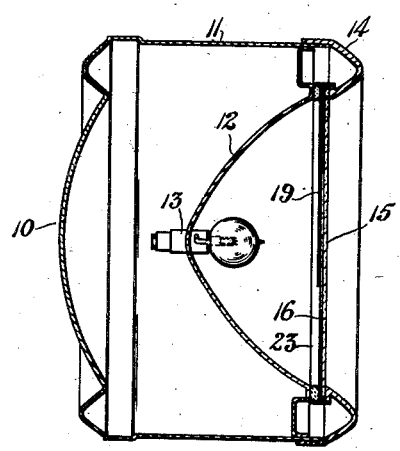
Figure 4:
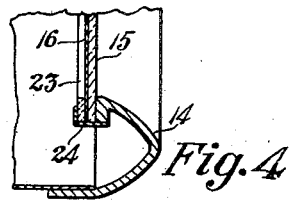
Figure 5:
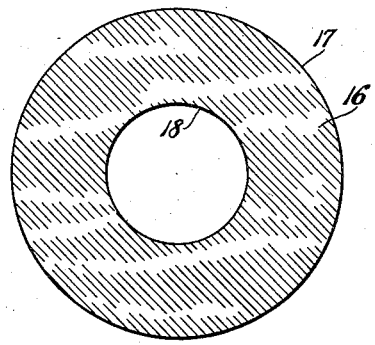
Figure 6:
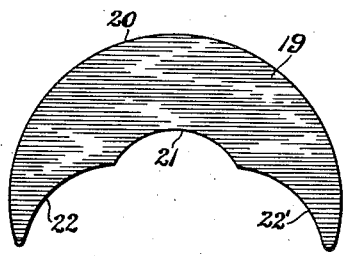

Figure 1 is a front elevation view of a headlight supplied with the improved antiglare lens attachment;

Fig. 2, a rear elevation view of the headlight lens frame, lens, and anti-glare attachment;

Fig. 3, a vertical cross section of the headlight as on line 3—3, Fig. 1;

Fig. 4, an enlarged fragmentary section illustrating the method of applying the attachment as on line 4—4, Fig. 2;

Fig. 5, a detail elevation view of one of the translucent colored ring disks of one shade; and Fig. 6, a detail elevation view of one of the translucent crescent-like disks of another shade.

Similar numerals refer to similar parts throughout the drawings.

As herein illustrated and set forth, the improved anti-glare lens attachment is applied to an automobile headlight indicated generally at 10 of a usual design; and which may include a case 11 supporting a reflector 12 in which an electric light 13 is suitably mounted, preferably concentric with the case and the reflector. The headlight is also provided with a lens frame 14 fitting over the forward edges of the case 11 and which may mount a circular lens 15.

Such a headlight including a case, reflector, lamp, lens frame, and lens provides suitable illumination for a roadway and the like upon which it may be directed, but the light rays emanating therefrom are glaring and blinding to an oncoming person who may be the driver of another automobile, and this glaring and blinding quality of the light rays often causes serious accidents.

Many devices have heretofore been utilized for eliminating or diminishing the glaring and blinding quality of headlight rays, but it has been found difficult to provide such a device which would eliminate the glare and at the same time satisfactorily maintain a suitable illuminating power for the headlight.

The present lens attachment includes the use of a translucent ring disk 16 of one shade, preferably made of kodeloid, and preferably having an outer circumferential edge 17 equal in diameter to the outer circumference of the lens 15, and an inner circumferential edge 18 whose diameter is determined by experiment for permitting the unobstructed passage of the bull's eye rays from the headlight, the translucent colored ring disk 16 of one shade removing the glaring quality from the annular band of rays immediately surrounding the bull's eye rays.

For further subduing and removing the glare from the annular band of rays immediately above the bull's eye rays, and for spreading out over the roadway the lower rays of the annular band passing through the ring disk 16, a translucent colored crescent-like disk 19 of another shade, preferably made of kodeloid, is provided, its outer arc edge 20 preferably being of the same radius as the circumferential edge 17 of the band of the ring disk 16 and its intermediate arc edge 21 preferably having the same radius as the inner circumferential edge 18 of the disk 16 for corresponding with the circumferential edges of the ring disk 16 when the crescent-like disk 19 is superposed thereagainst. The inner arc edge 21 of the crescent-like disk 19 is joined at each of its terminals with the outer arc edge 20 as by means of downwardly sloping arcuate edges 22 and 22'.

In use the translucent colored ring disk 16 of one shade is preferably applied against the inside of the headlight lens 15 so that the outer circumferential edges of the headlight and the disk correspond.

The translucent colored crescent-like disk 19 of another shade is then superposed against the ring disk so that the outer arc edge 20 of the crescent disk corresponds to the outer circumferential edge of the ring disk, and preferably so that the radial bisector of the arc edge 20 of the crescent disk is in a vertical position with respect to the vertical axis of the headlight lens. A ring washer 23 of cardboard, felt and the like may then be superposed over the crescent-like disk and the ring disk and lugs 24 secured to the lens frame 14 may be bent over the washer 23 to securely fasten the anti-glare attachment to the headlight lens.

As illustrated, the color of the translucent ring disk is green, and the color of the translucent crescent-like disk is blue; the combination of the same having been found by experiment to be desirable for the purpose intended. It is also intended, however, to use other color combinations for the ring disk and the crescent-like disk, such as combinations of different shades of red and the like.

It is also contemplated to provide a series of ring disks and crescent-like disks having the diameters of standard lenses for automobile headlights so that any automobile headlight lens may be equipped with the attachment.

I claim:

1. Attachments for headlight lenses and the like, including a translucent colored ring disk of one shade and a translucent colored crescent-like disk of another shade superposed upon each other for application against the headlight lens.

2. Attachments for headlight lenses and the like, including a translucent colored ring disk of one shade and a translucent colored crescent-like disk of another shade superposed upon each other for application against the headlight lens, the tips of the crescent extending beyond a diameter of the ring disk parallel with the crescent tips.

In testimony that I claim the above, I have hereunto subscribed my name.

GEORGE E. KOPP.